United States Patent
Ryan

(10) Patent No.: US 7,341,020 B2
(45) Date of Patent: Mar. 11, 2008

(54) ANIMAL HOUSING STRUCTURE AND APPARATUS

(76) Inventor: Kenneth J. Ryan, 1133 Broadway, 4th Floor, New York, NY (US) 10010

(*) Notice: Subject to any disclaimer, the term of this patent is extended or adjusted under 35 U.S.C. 154(b) by 211 days.

(21) Appl. No.: 11/079,061

(22) Filed: Mar. 14, 2005

(65) Prior Publication Data

US 2006/0201437 A1 Sep. 14, 2006

(51) Int. Cl.
*A01K 29/00* (2006.01)
(52) U.S. Cl. .................... 119/161; 119/484
(58) Field of Classification Search ............... 119/484, 119/161, 165; D30/108, 112, 161
See application file for complete search history.

(56) References Cited

U.S. PATENT DOCUMENTS

| | | | |
|---|---|---|---|
| 2,932,279 A * | 4/1960 | Giles | 119/484 |
| 3,872,832 A | 3/1975 | Quin | |
| 3,885,523 A * | 5/1975 | Coleman | 119/165 |
| 4,224,899 A * | 9/1980 | Cruchelow et al. | 119/501 |
| 5,165,366 A | 11/1992 | Harvey | |
| 5,188,063 A | 2/1993 | Evans | |
| 5,842,438 A | 12/1998 | Messmer | |
| 5,890,455 A * | 4/1999 | Donchey | 119/484 |
| 5,975,017 A | 11/1999 | Cameron | |
| 6,253,711 B1 * | 7/2001 | Shibles | 119/484 |
| 6,286,458 B1 | 9/2001 | Rawson | |
| 6,439,166 B1 | 8/2002 | Markham | |
| 6,698,384 B2 * | 3/2004 | Markowitz | 119/473 |
| 6,944,990 B2 * | 9/2005 | Noyes | 49/169 |
| 6,945,193 B1 * | 9/2005 | Tanner et al. | 119/165 |
| 7,069,877 B2 * | 7/2006 | Ehrreich | 119/485 |
| 2003/0168017 A1 | 9/2003 | Perelli et al. | |

* cited by examiner

*Primary Examiner*—Kimberly S. Smith
(74) *Attorney, Agent, or Firm*—Lackenbach Siegel LLP

(57) ABSTRACT

A housing structure assembly includes a hull and a front wall removably coupled to the hull and configured to simulate a front cover of an air conditioner upon inserting the housing structure assembly into a wall or window opening that is shaped and dimensioned to receive the air conditioner.

16 Claims, 3 Drawing Sheets

ANIMAL HOUSING STRUCTURE AND APPARATUS

BACKGROUND OF THE INVENTION

1. Field of the Invention

The invention generally relates to a structure and apparatus for providing pets with a housing. In particular, the invention relates to a housing structure for small household animals including, but not limited to, cats that is inconspicuous.

2. Description of the Related Art

As a pet, cats now surpass dogs as the most popular in the United States. There are good reasons for this. Cats are good friends and companions. Cats feel good to the touch, greet us upon arriving, and demand a minimum of attention. Working people find cats easier to leave at home because, when left alone, they exhibit fewer behavior problems than dogs.

Cats are intelligent, sensitive animals that are completely dependent on their human caregivers. These qualities make them very trainable. A hallmark of feline behavior is independence and individuality. They have certain innate needs such as scratching, jumping onto high places, cleanliness of toilet, play and exercise, cuddling, and being included in conversations. As stewards of these pets, we must accept these needs and provide for their expression.

Cats are creatures of territorial security and have a very strong need to have a place or den where it can be itself and to be left alone to rest undisturbed. One of the reasons for providing a cat with its own place is because a cat feels most comfortable returning to a den. Among the more common hiding or resting places (dens) are inside paper bags and cardboard boxes. Particularly desirable, from the cat's point of view, are long narrow boxes in which only a side opening exists. However, even a simple box, such as a carton used to contain twenty-four conventional soda or beer cans, becomes a play or rest area for the typical cat. On the other hand, if a mat, mattress, or other non-walled structure is laid out for a cat, the average cat will ignore that element, preferring a corner, box or other enclosed area.

There have long been miniature houses for animals, including cats. These houses often have been designed to charm and entertain the cat owner with their external similarity to human houses. While designing a cathouse to charm the owner is important from a commercial view, since it is the owner who is spending the money to purchase the house, the cats are frequently reluctant to use the house. This reluctance may result from a lack of privacy or containment or a lack of a definable territory. Cat owners often find, to their dismay, that the cat prefers a simple construction to the expensive store bought house.

A few types of pet houses, disclosed in the following patents, represent fairly typical modern trends in the industry.

Quinn (U.S. Pat. No. 3,872,832), discloses an indoor cat house, and employs a cat house that is designed to appear as a general item of furniture and yet include the litter box, access door, etc.

Evans (U.S. Pat. No. 5,188,063), discloses a combination simulated planter and cat litter enclosure in employing a furniture-look alike to mask the appearance of the litter box.

Rawson (U.S. Pat. No. 6,286,458), discloses an animal housing furniture apparatus providing for the use of a furniture item, with an access door for housing a litter box.

A high concentration of cats in urban settings, and particularly apartment buildings, presents many challenges to both cats and cat owners. On the one hand, regardless of how effective pet odor repellants are, the odor of the cat's litter is still too strong to be ignored. This problem was recognized long ago and dealt with by the following disclosures.

Messmer (U.S. Pat. No. 5,842,438), discloses an automatically ventilated feline litter box employing a housing unit insertable into a window and including an entry port, entry way, liter box, opening for removal of waste and an automated ventilation system.

Harvey (U.S. Pat. No. 5,165,366), discloses an outdoor window mounted litter unit including a window mounting fixture, swinging cat-access door, ventilation openings, litter holding area and floor ventilation.

Clemmons (U.S. Pat. No. 6,439,166), discloses an exterior litter box for a cat, accessible via a floor flap opening on the side of a building.

Cameron (U.S. Pat. No. 5,975,017), discloses an exterior mounted housing for animal litter box that has a pivoting cat-access door and is provided with multiple compartments.

Perelli et al. (US Publication No. 2003/0168017), discloses a cat outhouse employing an exterior box, which is accessible from the inside floor level via a door flap and provided with a litter box and ventilation openings.

Concomitantly, one of the main concerns of apartment owners is the lack of space. Even the most compact cat dens still occupy a substantial space. In addition, attractive designs of cat homes are often cost-prohibitive.

Furthermore, having a pet in an apartment building has created quite a few unexpected problems, which are associated with very specific rules and regulations usually set by boards of directors or landlords. For example, many cooperatives simply do not allow the shareholders to keep pets, including cats. While the nature of such bylaws may or may not have convincing reasons, many residents tend to ignore these regulations and keep their pets. Risking to be caught by fairly regular inspections, it is not unusual to hear stories when panicky pet owners literally hide their pets in places that cannot be easily discovered by the inspector, but can be dangerous for the well being of the hidden pets, even if the inspection does not take a long time.

Even if there are no restrictions, many apartment and house owners prefer to have the cat's house camouflaged for aesthetic reasons.

A need, therefore, exists for a pet housing structure that can be deceptively positioned and camouflaged from an observer as a piece of interior design.

A further need exists for a pet housing structure that has a structure mountable to standard window or wall openings, which are configured to support and house typical air conditioners.

A further need exists for a pet housing structure that has an inexpensive and easily maintainable structure.

Still another need exists for a pet housing structure that can be produced by a simple and efficient conversion of already existing household apparatus.

OBJECTS AND SUMMARY OF THE INVENTION

The invention is directed to an animal housing structure and apparatus that satisfy at least one of the above-noted needs. The housing structure configured in accordance with the invention allows the pet owner to provide household animals including, but limited to cats, with a convenient den that can be mounted to already existing openings, which are generally designed to receive hulls of various room air conditioners. Typically provided in walls or windows, these openings allow the inventive housing structure to exactly simulate a common air conditioner and thereby completely camouflage a pet-receiving cavity from people in the room.

The inventive housing structure employs the outer casing or hull for consumer room air conditioners configured to fit window or wall openings. The inventive structure is preferably formed by removing multiple electro-mechanical components from the existing air conditioner's hull, so as to form a pet-receiving chamber within the hull.

In accordance with a further aspect of the invention, the inventive hull may be specifically manufactured to replicate the closely existing structures of existing room air conditioners. While existing hull structures are typically made from metal, specifically manufactured hulls can be adaptively made from engineering plastic or other materials without departing from the scope and spirit of the present invention.

Once many, but not necessarily all, of the mechanical and electrical components have been removed from the hull, its interior or enclosure defines an inner pet receiving cavity configured to provide a pet, such as a cat, with a comfortable environment. To camouflage the pet receiving cavity, a front cover configured to closely replicate a cover assembly of a typical room air conditioner is removably mounted to the hull or enclosure so as the assembled housing structure not only fits the openings, but it also retains the common appearance of the typical air conditioner. Such appearance may feature, for example, vent openings all around the modified hull, air intake and outlet ports, dials, scales, knobs and the like that usually are provided on the air conditioner's air cover assembly so as to augment the camouflage capacity of the present invention.

In accordance with one embodiment of the invention, the openings may be configured as louvers typically formed in opposite sidewalls of the hull. A further embodiment of the inventive housing structure can feature the opening configured as simple slots or holes, or combinations of louvers, slots, and holes, depending upon the design of a replicated air-conditioner. Of course, a manufacturer may simply use exactly the same hull as an air conditioner, and then simply use it for the present purpose. In any of these embodiments, openings are arranged to provide air communication between the interior of the inventive hull and an ambient air outside the confines of a room, for suitable venting.

Therefore, the inventive animal housing structure is shaped and dimensioned to replicate the exterior appearance of an air-conditioner and to fit a wall or window installation for the air-conditioner.

While, of course, a variety of shapes are conceivable within the scope of this invention, the inventive structure has preferably a polygonal cross-section defined by top, bottom, side, rear and front walls spaced from and coupled to one another to delimit the pet cavity.

In accordance with embodiment of the invention, in addition to the removable front cover, the rear wall or selective side of the inventive housing structure may be removably attached to the rest of the hull, enabling ready disassembly and transport without detracting from the need to present an outward appearance of a commercial air conditioner.

Still a further embodiment features the rear wall as a permanently fixed housing component.

As have been known for quite some time, many pets prefer multi-compartment housing structures. As a consequence, the pet cavity is partitioned into rest and litter box compartments, which are connected to one another by a corridor or passage allowing the pet to shuttle between these compartments in accordance with need or desire.

In according to one embodiment of the invention, a partition may extend between the cover and rear wall of the hull and terminate at a distance from the rear wall, thereby defining the corridor or passage.

Still a further modification of the inventive structure features a door made within the partition that, thus extends at a full length between the front cover and rear walls. The door may be hinged to the partition so as to swing an open position in response to an insignificant force applied by a trained pet.

To provide a further resemblance of the inventive pet housing with a typical air conditioner, the front wall or cover of the animal housing is formed with a plurality of alternating elongated lands and recesses, which extend substantially between the sidewalls and function as multiple intake inlet ports that are, of course, an integral element of the air conditioner's cover assembly. Masking an entrance door structure that, if well defined, may readily identify the real functionality of the inventive structure, the elongated lands are cut to have the entrance door that extends in the same plane as the front wall of the enclosure in its closed position. Moreover, since the cut edges are closely positioned to one another, identification of the entrance door by an un-ready eye is rather difficult. To further camouflage the inventive structure as an air conditioner, the entrance door is provided with hidden hinges completing masking the inventive structure as an air conditioner.

In accordance with a further aspect of the invention, the inventive housing structure allows pets, which, like people, enjoy a comfortable temperature, light, and fresh air, with an arrangement of electro-mechanical components configured to meet these needs.

Further to this concept, in accordance with one aspect of the invention, the pet-receiving cavity has a light unit and fan controllably operable to create such a comfortable environment.

A further aspect of the invention is concerned with a power source energizing the electro-mechanical components. Obviously, a conventional power cord may be supplied, but in the spirit of reducing the cost associated with maintenance of the animal structure, the power source is preferably selected from alternative sources of energy such as a solar cell.

Realizing that the potential of the solar cell may be somewhat limited and dependent on capricious climatic conditions, the inventive structure is equipped with a control unit coupling the solar cell with the power consuming components in a manner preventing their unlimited use. Selected from an electronic microprocessor that is provided with executable programs or a wired circuitry, both the fan and light units are selectively energized for a predetermined period of time.

In accordance with one embodiment of the invention, the light unit is energized in response to a signal from a motion or position sensor generating a signal upon opening the door, which typically occurs when the pet enters the inventive structure.

In a further embodiment of the invention, the light unit is automatically turned off after a predetermined period of time.

Also, since the pet owner uses the inventive structure whose largest part is located outside a room, a temperature inside the pet-receiving cavity may uncomfortably rise dependent upon the weather. To minimize a negative effect of elevated temperatures within the inventive structure, the inventive structure configures a further embodiment of the invention providing for a fan unit to be controllably turned on when a thermo sensor, which is mounted to the enclosure, detects an upper threshold of an acceptable range of temperatures.

Conversely, in accordance with a further aspect of the invention, when temperatures reach a low temperature threshold, the thermo sensor will generate a control signal received and processed by the control unit that is operative to turn on the light unit, and optionally a separate heating unit. As a consequence, the light unit dissipates the heat, warming up the pet-receiving cavity to acceptable temperatures, which, in turn, are detected by the thermo sensor generating a further signal that is processed by the control unit operative to turn off the light unit.

As noted, in an alternative embodiment, instead of using the light unit or source for heating the pet-receiving cavity, the inventive structure may be provided with a heating element, which, like other electro-mechanical components of the inventive structure, is controllably operated by the control unit.

The above, and other objects, features and advantages of the present invention will become apparent from the following description read in conduction with the accompanying drawings, in which like reference numerals designate the same elements.

DETAILED DESCRIPTION OF THE PREFERRED EMBODIMENTS

Figure 1:
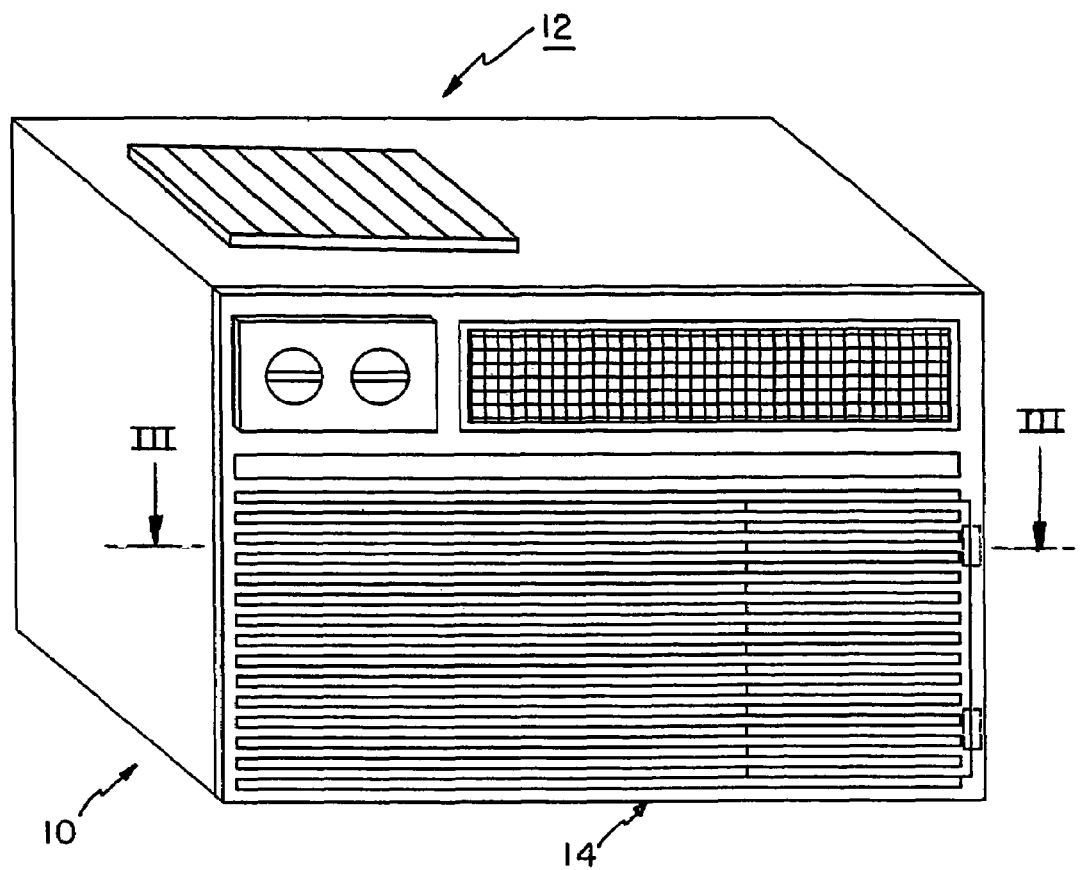
FIG. 1 is a perspective view of a housing structure configured in accordance with one aspect of the present invention, and shown in an assembled state.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, left, right, up, down, over, above, below, beneath, rear, and front may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices. Additionally, terms "housing structure" and "apparatus" are used interchangeably.

Figure 2:
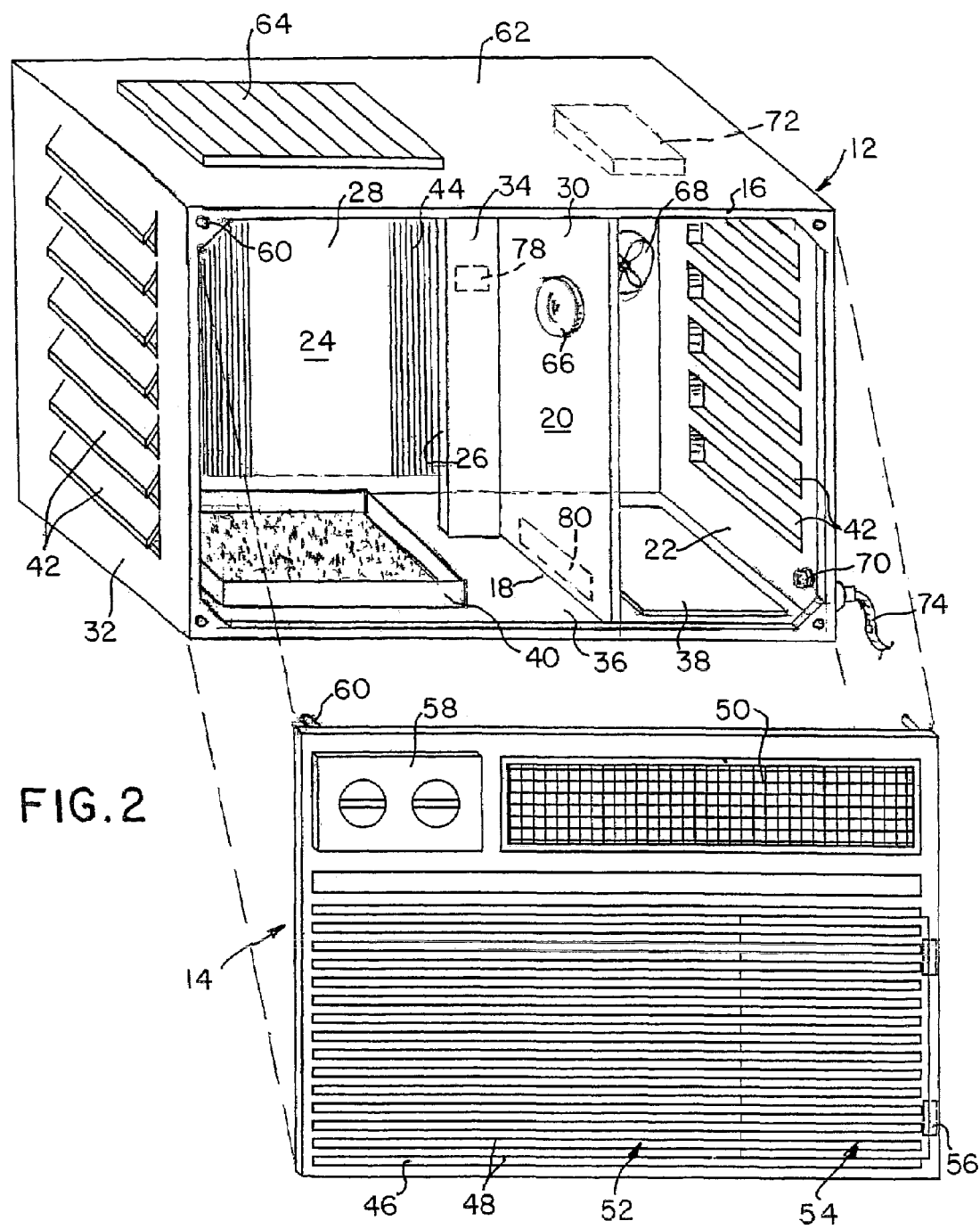
FIG. 2 is a perspective exploded view of the inventive housing structure.
Figure 3:
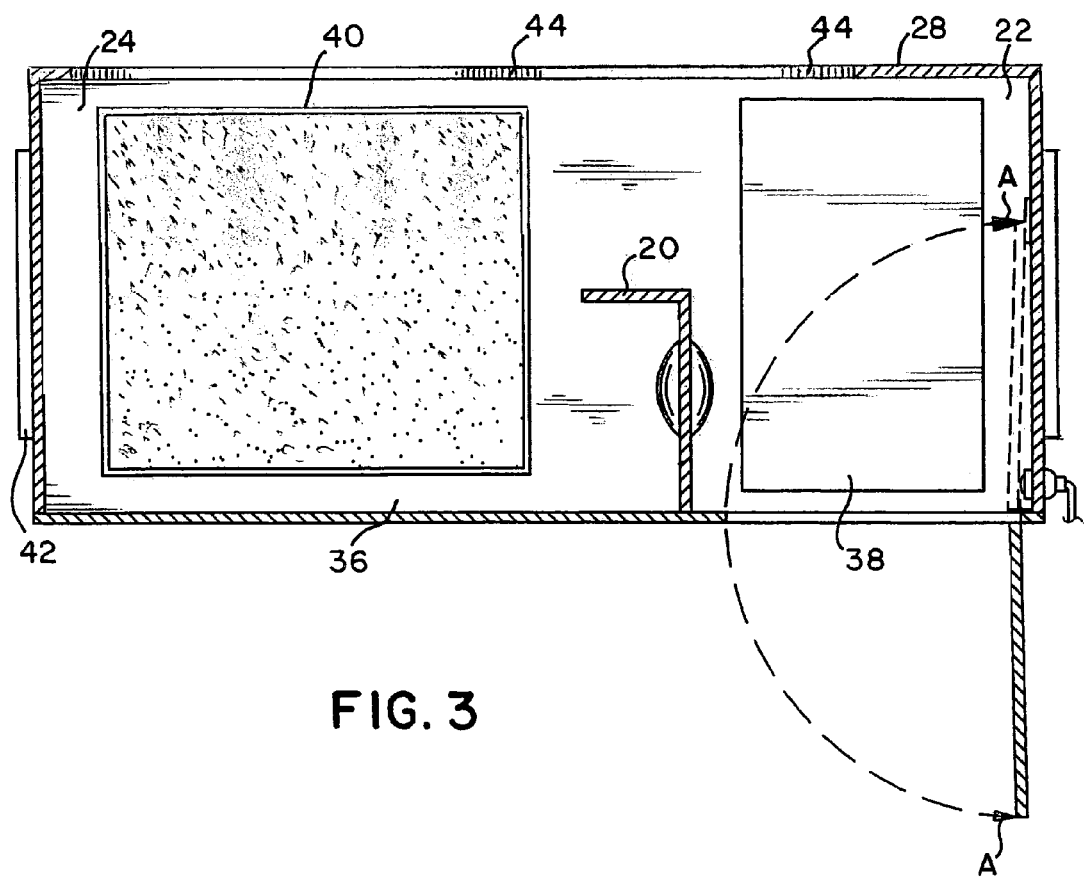
FIG. 3 is a cross-sectional view of an enclosure of the inventive housing structure as viewed along lines III-III that are provided in FIG. 1.

Referring to FIGS. 1 through 3, a housing structure or housing structure 10 is configured in accordance with a main concept of the invention to have an appearance and configuration of a standard room air conditioner. Provided with inventive housing structure 10, the pet owner may maximize the limited space of his/her apartment or house by mounting the housing structure in already existing wall and/or window openings. Configured primarily, but not exclusively, so as to provide a rest area for cats, housing structure 10 has an enclosure or hull 12 dimensioned to slide within the wall or window opening so that its largest portion extends outside beyond the wall of apartment buildings or houses. To complete simulation of the appearance of a typical air-conditioner, as shown in FIGS. 1 and 2, housing structure 10 has a front cover 14, which is removably coupled to a front peripheral edge 16 of hull 12, which defines an opening into a pet-receiving cavity 18 within hull 12.

In accordance with one embodiment of the invention, housing structure 10 represents a modification of already existing air conditioner structures and, thus, has hull 12 typically made from metal. At the same time, front cover 14 is typically a light-weighted component made from engineering plastics and produced by numerous molding techniques.

In accordance with a further embodiment of the invention, however, housing structure 10 may be manufactured to completely resemble existing air-conditioners, but have hull 12 made from materials other than metal. For example, hull 12 may be made from plastic. This modification of the inventive housing structure may not only reduce its overall weight, but also, in mass production, molded hulls can be manufactured in a cost-effective manner.

If hull 12 is manufactured by modifying existing air-conditioner structures, the craftsman may remove all or some of the known electro-mechanical components of the air-conditioner including, among others, a compressor and motor, and redesign the interior of the air conditioner's housing so as to meet the needs of pet owners. Knowing the importance of a multi-compartment structure for cats, the craftsman initially inserts a partition 20 in pet receiving cavity 18 thereby dividing the latter into a rest compartment 22 and a litter box compartment 24, as shown in FIG. 2.

Compartments 22 and 24 are, of course, not isolated from one another and have a passage 26 that connects them and is used by the pet. In accordance with one inventive embodiment, passage 26 (FIG. 2) may be defined by a spaced between a rear wall 28 of hull 12 and the distal end of partition 20. Preferably, partition 20 has an L-shaped cross section allowing a larger portion 30 of partition 20 to extend parallel to sidewalls 32 of hull 12, and a smaller portion 34 to extend generally parallel to rear wall 28 of hull 12 and be spaced therefrom at a distance so as to define passage 26.

In accordance with a further embodiment, partition 20 may extend towards and abut rear wall 28 of hull 12 and be provided with a door (not shown). Partition 20 may be manufactured from a variety of materials including metal, plastic or glass.

Mounting partition 20 to hull 12 may be realized in a variety of ways. For example, partition 20 can be fixed to the interior of the hull. Alternatively, a bottom side 36 of hull 12 may be provided with a guide trough (not shown) extending parallel to sidewalls 32 and configured to slidably receive partition 20. As a consequence, partition 20 may be adaptively mounted to hull 12, and when desired is fully removable allowing hull 12 to function as one large room. If the partition is shorter than a distance between front cover 14 and rear wall 28 in the assembled state of housing structure 10, the pet owner slides the partition to a position selected according to his/her own preferences and/or the pet's habits.

Rest compartment 22 is specifically formed to allow the pet to enjoy certain attractions while feeling completely safe. For example, cats, unlike dogs, enjoy an optional soft support or mat 38. Depending on dimensions of an entrance door 54, which is formed on cover 14, as will be explained herein after, a portion of bottom 36 of hull 12 may be provided with a sunken area or recess receiving mat 38 so that the upper surface of the latter does not protrude above the rest of bottom 36. Adding to the pet's comfort, the pet owner may equip rest compartment 22 with various toys, such as a scratcher (not shown) suspended from one of the walls, which define this compartments. It will be appreciated by those of skill in the art, that mat 38 may be fully removed for cleaning or use, and may be selected from the vast array of conventionally known carpet and mating products without departing from the scope and spirit of the present invention.

The litter box compartment 24 is dimensioned to receive a pan 40, whose dimensions are so selected that while the pet has plenty of room within the box, it still is able to walk around the pan. Coupling between pan 40 and bottom 36 of hull 12 may include a variety of means. In accordance with one embodiment, bottom 36 may be provided with a pair of guide elements (not shown), which slidably receive the pan so as the pet owner may easily install or remove the pan from hull 12. In accordance with a further embodiment, bottom 36 of hull 12 may be provided with recesses formed so as to receive and retain protrusions extending from pan 40, and conversely. In accordance with the latter configuration, the pet owner positions the pan above the recesses and then lowers it in a manner allowing the protrusions to extend into the recesses.

Due to the confined space of inventive structure 10, a ventilation problem is solved by providing sidewalls 32 (and front cover 14 as explained below) with a plurality of openings 42. Typically, air conditioners are provided with louvers, which are shown on the sidewall of the litter box compartment 24. However, in an alternative modification, openings 42 may have other shapes and configurations including rectangular recesses, as can be seen on sidewall 32 of rest compartment 22.

As mentioned above, when the inventive structure is a modification of the existing air-conditioners, not all of the original components have to be removed. For example, backside 28 of hull 12 may have a plurality of fins 44. Moreover, similarly to the fins' function and configuration in the original design of the air-conditioner, the fins, which are a stack of very thin metallic sheets, may be traversed by pipes (not shown). If the pet owner so desires, these pipes can be coupled to and be in flow communication with a building hot water supply system. As a consequence, fins 44 may function as a heating element thereby solving a problem that is associated with low outside temperatures. Of course, in this embodiment, fins 44 should be heat isolated, and partition 20, preferably, should be positioned so that passage 26 is formed next to front cover 14.

In an additional embodiment, it is foreseen that backside 28 of hull 12 may be formed in a fixed or removably-mounted manner to the rest of hull 12, enabling ready rear access to hull 12 for cleaning and other functions, or in a fixed mode enabling substantial structural stiffing.

In yet another alternative embodiment, backside 28 of hull 12 may additionally include fan 68 in a variety of positions.

Thus, hull 12 is configured as a multi-compartment enclosure provided with a passage between adjacent compartments and equipped with an arrangement of objects and structures, which are configured to provide a pet with an environment resembling the pet's natural habitat.

To camouflage the inventive structure as a typical air conditioner, front cover 14 is configured with an arrangement of alternating lands 46 and slots 48, which, in combination, form a grill 52 (FIGS. 1, 2) extending practically across the entire length of the outer face of cover 14. As is known in the art of room air conditioners, the grill functions as an intake air port, except for opposite edge areas. A screen 50, on the other hand, typically serves as an outlet air-port. Thus, these components of a typical air-conditioner are adapted to function in accordance with their original design and provide housing structure 10 with additional means for ventilating the interior of hull 12.

Lands 46 are cut to form a portion of grill 52 defining entrance door 54, which is dimensioned to swing inside rest compartment 22 of hull 12, when a pet enters housing structure 10, or outside when the pet leaves the inventive structure, as indicated by arrows A-A of FIG. 3.

To mask door 54 as an integral part of grill 52, it is hinged to front cover 14 by a pair of hidden hinges 56, which are mounted to edge region of the cover. In accordance with one embodiment, hinges 56 may be formed from a memory-shape material (not shown) that deforms so that door 54 swings in opposite directions at a predetermined angle. For instance, door 54 swings outwardly at about a 90° or less degree angle, whereas during inward pivoting the door is displaced at about a 90° angle. The shape memory elements are so configured that once the door reaches the predetermined angle, these elements tend to contract bringing the door in its closed position, in which it extends coplanar with the rest of lands and slots 46 and 48, respectively. Alternatively, standard hinges 56, as shown in FIG. 2, may be used as well.

In a further alternative embodiment, door 54 may be invisibly hinged at a top portion, and allowed to operate as a flap. In this manner, this alternative design allows door 54 to operate upwardly relative to the inner floor surface. This adaptive embodiment allows ready places of the hinges thereby providing desirable manufacturer items and eliminating the need for an automatic self-closing mechanism, as the force of gravity would operate to return the door to the vertical-closed position.

In a further embodiment of the invention, door 54 may be provided with a latch reacting to a magnetic element that can be mounted to the pet's collar in a known manner. As the pet approaches the door, the latch is activated allowing thus the pet to push and open the door in both directions. As a consequence, accidental or deliberate attempts to open door 54 would not be successful reinforcing, thus, the perception of real air-conditioners.

In addition, the front face of front cover 14 has a plurality of scales, buttons and knobs, cumulatively denoted as a control unit 58, as is illustrated in FIG. 2. It has to be noted that, if inventive housing structure 10 is manufactured anew, as opposed to the modified original cover of the air-conditioner, all of the components, which are typically located on the original cover, are positioned so as to replicate a typical layout.

One alternative embodiment of the present invention envisions that the front grills and openings on cover 14 may be closed (airtight) when desired to prevent odors from entering the human living space. Thus, this alternative embodiment preserves the deceptive outward appearance of the device while also preventing disclosure by odor.

Attachment of front cover 14 to hull 12 may include a variety of coupling means 60. As shown in FIG. 2, the coupling means may be configured as pins, which are formed on one of the cover and hull, and holes formed on the other one of these components. In an alternative embodiment, front cover may be screwed to hull 12. A further embodiment of coupling means 60 may include matching formations on the opposing surfaces of the hull and cover, which are configured, for example, as a dovetail structure (not shown). Thus, any known coupling means 60 may be utilized as long as the cover can be coupled to and detached from hull 12 in a time-effective and simple manner.

A particularly attractive feature of housing structure 10 relates to a control means for additional ventilation and illumination of compartments 22 and 24. Taking advantage of the outside location of the larger part of hull 12, an outer face of top wall 62 (FIG. 2) has a solar cell 64 naturally rechargeable during a good, sunny weather. The cell's stored energy may be used to power a light source unit 66 so needed by a pet within hull 12 and an air stream generating unit 68.

Since there is no need for these components to function continuously, housing structure 10 is further provided with a position or motion sensor 74 (FIG. 2) located within rest compartment 22 and operative to generate an output signal for turning light and fan units 66 and 68, respectively, in response to opening door 54. Both units are strategically located within hull 12 to provide the desired effect. For example, light source unit 66 is advantageously mounted to larger portion 30 of partition 20 and emanates light across both rest and litter box compartments 22 and 24, respectively. Fan unit 68 may be mounted in any convenient location within rest compartment 22, as shown in FIG. 2, or, alternatively, within litter box compartment 24.

Even if the pet is inside hull 12, a continuous operation of units 66 and 68 is not required. In fact, both these units should be functioning selectively under certain circumstances. For example, light source unit 66 may be in its on-state for a predetermined period of time, after which unit 66 is turned off. Fan unit 68 also has to operate when either a temperature inside the hull is prohibitively high, or when the pet uses pan 40. To meet these needs, inventive apparatus 10 has a control unit 72 conveniently mounted to hull 12, for example, on the inner face of top wall 62, and operative to receive the output signal from sensor 70 upon opening door 54. Subsequently, control unit 72 is operative to generate a control signal that energizes light source unit 66 for a predetermined period of time.

To use fan unit 68 in a controllable manner, one of or both compartments 22 and 24 can have a thermo sensor 78 (FIG. 2) detecting both low and high threshold temperatures and operative to generate a respective output signal. Similarly to motion sensor 70, control unit 64 is operative to receive the output signal and generate a respective control signal either energizing or turning off fan unit 68. As to the low temperature threshold, inventive housing structure 10 may be provided with a heating unit 80 or use light source unit 66 as a heating element controllably turned on or off in response to the control signals from unit 72. The control unit may be selected from a variety of electronic means including, for example, a microprocessor, which is provided with numerous executable programs, or a conventional hardware circuitry.

Alternatively, or in addition to the use of solar cell 64, inventive apparatus 12 may have a conventional electric cord 74 (FIG. 2) coupling all of the electromechanical units to a main power supply. Even if the cord is not used for the above-mentioned purpose, it still may be a decorative element adding to the camouflage of inventive apparatus 10 as a typical air conditioner.

The inventive housing structure 10 may be portable. Accordingly, hull 12 may be provided with removable or fixed pivotal handles that can extend parallel to the plane of the outer surface of hull 12 in a mounted state of apparatus 10, and extend from the hull's outer surface so that the pet owner can conveniently grab the handles during transportation of the inventive apparatus.

In one alternative embodiment of the present invention, a perch (not shown) is provided proximate front cover 14, to support the pet in the event that there is no windowsill available to aid pet transfer through the door to allow the pet to recline in a comfortable manner. The perch is approximately several inches (6 inches) wide, and may be carpeted or not carpeted, and may run the length of the front facade of front cover 14 or may be bare. In one aspect, the perch is removably attached to the front facade, either directly to cover 14 or to hull 12, and is pivotably fixed under the force of gravity allowing ready and convenient removal for camouflage.

The sidewalls, rear wall, top and bottom of hull 12 may be manufactured as a one-piece structure. In accordance with an alternative embodiment, these walls may be removably coupled to one another for convenient assembling/disassembling of inventive apparatus 10. Furthermore, bottom 36 may be provided with a plurality of openings for water drainage. As for the installation instructions as well as a means for installing, such as brackets configured to prevent tilting of apparatus 10, the inventive kit may include a typical manual describing in detail all of the components and their assembly along with necessary hardware elements typically used for installing air conditioners. Finally, top 62 may be provided with a steel angled bar extending across the outer face of the top so as to prevent the inventive housing structure from accidentally falling out of the window. The inventive apparatus may be installed by the pet owner or, preferably, by a professional installer.

This document describes various embodiments of the inventive structure for illustration purposes only. Neither the specific embodiments of the invention as a whole, nor those of its features limit the general principles underlying the invention. The specific features described herein may be used in some embodiments, but not in others, without departure from the spirit and scope of the invention as set forth.

Many additional modifications are intended in the foregoing disclosure, and it will be appreciated by those of ordinary skill in the art that in some instances, some features of the invention will be employed in this document as various embodiments of the inventive structure for illustration purposes only. Neither the specific embodiments of the invention as a whole, nor those of its features limit the general principles underlying the invention. The specific features described herein may be used in some embodiments, but not in others, without departure from the spirit and scope of the invention as set forth.

Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention and the legal protection afforded the invention, which function is served by the claims and their equivalents. The absence of a corresponding use of other features. The illustrative examples therefore do not define the metes and bounds of the invention and the legal protection afforded the invention, which function is served by the claims and their equivalents.

Housing structure of apparatus 10
Hull 12
Front cover 14
edge 16 partition 20
rest compartment 22
litter box compartment 24
passage 26
rear wall 28
large part of partition 30
sidewalls of hull 32
small part of partition 34
bottom 36
mat 38
litter box or pan 40
louvers 42
fins 44
lands 46
slots 48
screen 50
grill 52
door 54
hinges 56
control unit 58
couplers 60
top wall of hull 62
solar cell 64
Light source unit 66
/air-stream generating/fan unit 68
motion sensor 70
microprocessor 72
power cord 74
thermo sensor 78
heater 80

What is claimed is:

1. The housing structure comprising:
a hull defining a pet receiving cavity;
a door operative to provide a pet-access with a self-selectable access to and exit from the pet receiving cavity;
the hull being shaped and dimensioned to replicate an exterior of an air-conditioner, and to fit a wall or window installation for the air-conditioner, so that the housing structure has an appearance of the air conditioner;
a power source mounted to an exterior of the hull so that the power source is located outside a room upon insertion of the hull into the opening of the wall or window installation for the air conditioner,
an air-stream generating unit mounted within the hull and coupled to the power source,
a light source unit mounted within the hull and coupled to the power source, and
a sensor operative to detect displacement of the door upon entering of the pet into the pet receiving cavity and generate a signal in response to the detection, the sensor being coupled to the source unit so that the light source is turned on upon generating the signal by the sensor.

2. The housing structure of claim 1, further comprising a control unit coupled to the sensor, air-stream generating and light source units and operative to turn the light unit on for a predetermined period of time in response to receiving the signal from the sensor.

3. The housing structure of claim 2, further comprising:
a temperature sensor coupled to the control unit and generating a signal upon detecting a threshold temperature within the pet-receiving cavity, wherein the control unit is operative to selectively energize the air-stream generating unit in response to receiving the signal from the temperature sensor.

4. The housing structure of claim 3, further comprising:
a perch member; and
said perch member being fixable to said hull.

5. The housing structure of claim 1, wherein:
the power source is a solar cell.

6. The housing structure of claim 1, further comprising:
a perch member; and
said perch member being fixable to said hull.

7. A housing structure, insertable in an opening shaped to receive a sleeve of an air conditioner, and formed in a wall or window of a room, the housing structure comprising:
a hull dimensioned to fit within said opening and defining a pet-receiving cavity;
a front cover removably mounted to the hull and covering the pet-receiving cavity;
a plurality of alternating slots and lands provided on the front cover and having a portion thereof configured as a pet access door so as to provide the pet with an access to and exit from the pet receiving cavity;
wherein the front cover is shaped and dimensioned to simulate a visual appearance of a front side of the air-conditioner;
a motion detector sensor operative to detect displacement of the door upon entering of the pet into the pet receiving cavity and to generate a signal in response to detecting the displacement of the door,
a light source unit suspended within the sleeve in the pet receiving cavity, and
a control unit operative to receive the signal generated by the motion sensor and to energize the light source unit for a predetermined period of time.

8. The housing structure of claim 7, wherein the control unit is operative to de-energize the light source unit after the predetermined period of time.

9. The housing structure of claim 8, further comprising
an air-stream generating unit suspended within the pet-receiving cavity and coupled to the control unit,
a thermo sensor operative to detect a predetermined temperature and generate a signal, wherein the control unit is operative to turn the air-stream generating unit on in response to receiving the signal generated by the thermo sensor; and
a solar power source mounted to an exterior of the sleeve and coupled to the control unit, light and air-stream generating units.

10. The housing structure of claim 7, further comprising:
a perch member; and
said perch member being fixable to one of said hull and said front cover.

11. A housing structure comprising:
a hull defining a pet-receiving cavity;
a front cover removably mounted to the hull and covering the pet-receiving cavity;
a swingable door made from a portion of the front cover and operative to provide a pet with access into and exit from the inner pet receiving cavity;
a solar cell provided on the hull and located outside a room upon inserting the hull within an opening provided in a wall or window of a room;
an air-stream generating unit coupled to the solar cell and mounted within the pet-receiving cavity;
a light source unit coupled to the solar cell and mounted within the pet-receiving cavity;
a sensor coupled to the solar cell and operative to generate a signal in response to displacement of the swingable door upon entering the pet into the pet receiving cavity; and a control unit mounted to the hull and receiving the signal from the sensor so as to generate a first control signal turning the light source on for a predetermined period of time.

12. The housing structure of claim 11, wherein:

the hull is shaped and dimensioned to fit a wall or window opening for a room air conditioner, the front cover being configured to simulate a front face of a room air conditioner so that when the hull is inserted into the opening and the front cover is coupled to the hull, the housing structure provides an appearance of the air conditioner.

13. The housing structure of claim 11, wherein:

the pet-receiving cavity has an L-shaped partition dividing the pet-receiving cavity into adjacent rest and litter box storage compartments and sized to provide a passage between the adjacent compartments.

14. The housing structure of claim 11, further comprising:

a thermo sensor operative to detect low and high temperature thresholds and generate a respective output signal, and a heating element selectively turned on and off in response to a control signal by the control unit generating a second control signal in response to receiving the respective output signal from the thermo sensor.

15. The housing structure of claim 11, wherein:

the front cover is provided with a plurality of manually manipulated knobs and buttons configured to simulate a plurality of control scales of an air-conditioner, and a grill configured to simulate an outlet port of the air conditioner, whereas the front cover is configured to simulate a front wall of an air conditioner and to camouflage the pet-receiving cavity.

16. The housing structure of claim 11, further comprising:

a perch member; and said perch member being fixable to one of said hull and said front cover.

* * * * *